(12) United States Patent
Wu et al.

(10) Patent No.: US 12,013,227 B2
(45) Date of Patent: Jun. 18, 2024

(54) SYSTEM AND METHOD FOR AUTOMATICALLY MEASURING EXHAUST AREA OF TURBINE GUIDE VANE

(71) Applicant: BEIJING AEROSPACE INSTITUTE FOR METROLOGY AND MEASUREMENT TECHNOLOGY, Beijing (CN)

(72) Inventors: Tong Wu, Beijing (CN); Yue Gao, Beijing (CN); Yinxiao Miao, Beijing (CN); Ke Liu, Beijing (CN); Lizhen Guo, Beijing (CN); Zengyu Sun, Beijing (CN); Haicun Zhang, Beijing (CN)

(73) Assignee: BEIJING AEROSPACE INSTITUTE FOR METROLOGY AND MEASUREMENT TECHNOLOGY, Beijing (CN)

( * ) Notice: Subject to any disclaimer, the term of this patent is extended or adjusted under 35 U.S.C. 154(b) by 0 days.

(21) Appl. No.: 17/857,284

(22) Filed: Jul. 5, 2022

(65) Prior Publication Data
US 2022/0333500 A1    Oct. 20, 2022

(51) Int. Cl.
*G01B 11/24* (2006.01)
*F01D 21/00* (2006.01)
(Continued)

(52) U.S. Cl.
CPC ............ *G01B 11/24* (2013.01); *F01D 21/003* (2013.01); *F01D 25/285* (2013.01); *G01B 5/008* (2013.01);
(Continued)

(58) Field of Classification Search
CPC ...... F01D 21/003; F01D 9/041; F01D 25/285; F01D 9/047; F05D 2230/644;
(Continued)

(56) References Cited

U.S. PATENT DOCUMENTS

| 2017/0206303 A1* | 7/2017 | Burkett | .................. G06F 30/17 |
| 2020/0096316 A1* | 3/2020 | Vinshtok | ............ G01B 11/2545 |

FOREIGN PATENT DOCUMENTS

| CN | 104990531 A | 10/2015 |
| CN | 105333855 A | 2/2016 |

OTHER PUBLICATIONS

Electronicsforu.com, IR LED |Infrared LED | Infrared Sensor, 2020, https://www.electronicsforu.com/technology-trends/learn-electronics/ir-led-infrared-sensor-basics (Year: 2020).*
(Continued)

*Primary Examiner* — Eric S. McCall
*Assistant Examiner* — Timothy P Graves

(57) ABSTRACT

A system for automatically measuring an exhaust area of a turbine guide vane, including a data acquisition module configured to measure a three-dimensional point cloud coordinate of a contour of a throat; a positioning module configured to automatically adjust a relative spatial position between the data acquisition module and the turbine guide vane; and a data processing module configured to fit a three-dimensional contour of the throat according to the three-dimensional point cloud coordinate measured by the data acquisition module. A method for automatically measuring an exhaust area of a turbine guide vane using the system is also provided.

9 Claims, 2 Drawing Sheets

(51) Int. Cl.
*F01D 25/28* (2006.01)
*G01B 5/008* (2006.01)
*G01B 11/00* (2006.01)
*G01B 11/28* (2006.01)
*G01B 11/25* (2006.01)

(52) U.S. Cl.
CPC .......... *G01B 11/005* (2013.01); *G01B 11/28* (2013.01); *F05D 2230/644* (2013.01); *F05D 2240/12* (2013.01); *F05D 2270/71* (2013.01); *F05D 2270/8041* (2013.01); *G01B 11/2518* (2013.01); *G01B 2210/54* (2013.01); *G06T 2207/10028* (2013.01)

(58) Field of Classification Search
CPC .......... F05D 2240/12; F05D 2270/71; F05D 2270/8041; F05D 2220/32; F05D 2220/36; G01B 11/28; G01B 11/24; G01B 21/28; G01B 11/005; G01B 11/2518; G01B 7/008; G01B 2210/54; G01B 5/004; G01B 5/14; G01B 5/205; G06T 2207/10028; G06T 7/521; G01M 15/02; G01C 15/002

See application file for complete search history.

(56) References Cited

OTHER PUBLICATIONS

Clearwater, Waybackmachine copy of clearwater composites, 2014, https://www.clearwatercomposites.com/resources/advantages-of-carbon-fiber/ (Year: 2014).*

* cited by examiner

SYSTEM AND METHOD FOR AUTOMATICALLY MEASURING EXHAUST AREA OF TURBINE GUIDE VANE

CROSS-REFERENCE TO RELATED APPLICATIONS

This application claims the benefit of priority from Chinese Patent Application No. 202110926164.7, filed on Aug. 12, 2021. The content of the aforementioned application, including any intervening amendments thereto, is incorporated herein by reference in its entirety.

TECHNICAL FIELD

This application relates to measurement of turbine engine guide, and more particular to a system and a method for automatically measuring an exhaust area of a turbine guide vane.

BACKGROUND

Gas turbine engine is one of the most common power generating machines, and it converts chemical energy into mechanical energy via a thermodynamic cycle, during which the air works as a medium. The core components of the gas turbine engine include a fan, a combustion chamber and a turbine. The turbine guide is used for changing the speed and direction of the high-temperature and high-pressure fuel gas flow, so as to provide an appropriate air flow direction for the intake of the rotor vane and improve the working conditions of the turbine rotor.

The turbine guide in the aircraft engine mainly includes a housing, a mounting ring, a guide vane and corresponding accessories. The exhaust area of the throat (a channel between two adjacent guide vanes) of the turbine guide affects the operation of the engine, and thus it is one of the crucial parameters in the engine design and production. The exhaust area of the throat is measured to adjust the exhaust angle of the guide vane and render the rotor vane with the required inlet angle, so as to ensure the performance of the turbine. In addition, when assembling the guide vanes, the exhaust area of each throat channel is measured to determine whether the total exhaust area meets the requirement. If the total exhaust area fails to meet the requirement, the installation angle of the guide vanes will be adjusted until the exhaust area of the throat is qualified, and thereafter the guide vanes are fixed.

In the aircraft industry, the exhaust area of throats is measured mainly through the following strategies.

(1) Measuring Method Using a Measuring Tool Calibrated Via a Standard Sample

A special measuring tool is calibrated via a standard sample, and is used to measure the geometric parameters of the throats. The exhaust area of each throat is obtained by manual calculation according to the measured parameters, and is added up to obtain a total exhaust area. However, this method has cumbersome operations and a low measuring efficiency. In addition, too much data is required for calculating the exhaust area, such that the propagation of cumulative error is magnified. Therefore, this method has a large measuring error. Apart from the above, the exhaust area of a single through can also be calculated as follows. Particularly, a digital indicator of the measuring tool is zeroed according to a standard throat sample, and then a difference between an exhaust area of a throat to be measured and an exhaust area of the standard throat sample is calculated, such that the exhaust area of a single throat is obtained. Even though the impact caused by the cumulative error is weakened, the measuring error of such method is still large due to the indirect measuring way.

(2) Three-Coordinate Measuring Method

The three-dimensional coordinates of the throat contour are directly measured using a three-coordinate measuring machine, and then the exhaust area of the throat is calculated according to the measured coordinates of the measured points. In this method, the acquisition of the measured points is of high accuracy, and the measuring operation is automatic. Unfortunately, the density of the measured points is low, and therefore the contour features of the throat cannot be accurately reproduced. In addition, the throat of the turbine guide is narrow, which requires complicated three-coordinate programming. Besides, there are some areas of the throat where the contact probe of the three-coordinate measuring machine fails to acquire points.

(3) Acoustic Resonant Frequency Method

The Helmholtz resonance cavity is in sealing contact with the guide vane, and then the resonant frequency with the largest transmission loss of acoustic wave is identified according to the acoustic principle. The volume of the resonant cavity is calculated through the identified resonant frequency, so as to calculate the exhaust area of the throat. Nevertheless, this method has complicated operations, a lot of error terms and a low measuring accuracy.

SUMMARY

An objective of this application is to provide a system for automatically measuring an exhaust area of a turbine guide vane using non-contact optical measurement to solve the problems of low measuring efficiency and poor measuring accuracy in the existing measuring systems.

In a first aspect, this application provides a system for automatically measuring an exhaust area of a turbine guide vane, comprising:

a data acquisition module;
a positioning module; and
a data processing module;
wherein the data acquisition module is configured to measure a three-dimensional point cloud coordinate of a contour of each of a plurality of throats of the turbine guide vane using a non-contact measurement;

the positioning module is configured to automatically adjust a relative spatial position between the data acquisition module and the turbine guide vane, so as to allow the data acquisition module to perform a traversal scanning on the turbine guide vane; and the data processing module is configured to fit a three-dimensional contour of each of the plurality of throats according to the three-dimensional point cloud coordinate measured by the data acquisition module, so as to calculate an exhaust area of each of the plurality of throats and the exhaust area of the turbine guide vane.

In an embodiment, the data acquisition module comprises an optical scanner and a positioning tooling; the optical scanner is connected to the positioning module, and the optical scanner is configured to be driven by the positioning module to move, so as to adjust a relative spatial position between the optical scanner and the turbine guide vane; the positioning tooling is configured to locate and clamp the turbine guide vane; and at least three marking points are arranged spaced apart on the positioning tooling along a circumferential direction of the positioning tooling, wherein at least three marking points are configured to be recognized by the optical scanner.

In an embodiment, a distance-measuring module is arranged on the optical scanner, and is configured to measure a distance between a lens of the optical scanner and the turbine guide vane, so as to keep the optical scanner at an optimum measurement distance from the turbine guide vane.

In an embodiment, the distance-measuring module is an infrared positioning sensor.

In an embodiment, the positioning module comprises a six-degree-of-freedom (6-DOF) robot, a single-axis table and an automatic control unit; the optical scanner is connected to an end of the 6-DOF robot, and is driven by the 6-DOF robot to move; the single-axis table is connected to the turbine guide vane via the positioning tooling, and is configured to drive the turbine guide vane to rotate; and the automatic control unit is configured to control the 6-DOF robot, the optical scanner and the single-axis table to move according to a preset program to allow the optical scanner to complete the traversal scanning on the turbine guide vane.

In an embodiment, the 6-DOF robot is a collaborative robot having an automatic operation mode and a collaborative operation mode.

In an embodiment, a main axis of the single-axis table is designed as an external axis of the 6-DOF robot to allow a controller of the single-axis table to be integrated into a controller of the 6-DOF robot, such that the 6-DOF robot and the single-axis table are controlled by the controller of the 6-DOF robot.

In an embodiment, the positioning tooling is made of carbon fiber.

In a second aspect, this application provides a method for automatically measuring an exhaust area of a turbine guide vane using the system mentioned above, comprising:

(S1) connecting the turbine guide vane to the positioning tooling followed by fixing;

(S2) starting, by a host computer, the automatic control unit; controlling, by the automatic control unit, the 6-DOF robot to move to adjust a relative spatial position between the optical scanner and the turbine guide vane; controlling, by the automatic control unit, the single-axis table to rotate according to a preset frequency; feeding, by the single-axis table, a signal back to the automatic control unit every time the single-axis table rotates by a preset angle; and controlling, by the automatic control unit, the optical scanner to perform a local scanning on the turbine guide vane at the current position according to the signal to obtain a local three-dimensional point cloud data of a contour of each of the plurality of throats;

(S3) feeding back a signal, by the single-axis table, to the automatic control unit after rotating one cycle, and controlling, by the automatic control unit, the optical scanner and the single-axis table to stop; controlling, by the automatic control unit, the 6-DOF robot to move, so as to move the optical scanner to a next preset position; and restarting the optical scanner and the single-axis table to perform a circumferential traversal scanning at the next preset position;

(S4) repeating step (S3) until the optical scanner completes the traversal scanning on all preset positions, so as to complete an automatic scanning of the turbine guide vane to obtain scanning data; and sending the scanning data to the data processing module in real time; and (S5) automatically performing, by the data processing module, fitting of a three-dimensional contour of each of the plurality of throats according to the scanning data sent by the optical scanner in step (S4), and calculating, by the data processing module, the exhaust area of each of the plurality of throats and the total exhaust area of the turbine guide vane.

Compared with the prior art, this application has the following beneficial effects.

(1) The system provided herein has excellent measurement accuracy. Based on the principle of the non-contact optical measurement, the optical scanner with high accuracy directly measures the three-dimensional point cloud coordinate of the contour of each of the plurality of throats of the turbine guide vane to obtain the high-precision and high-density point cloud data. The three-dimensional contour of each of the plurality of throats is fitted through the measured point cloud data, and then the exhaust area of each of the plurality of throats and the total exhaust area of the turbine guide vane are calculated. Compared with the measuring method using the measuring tool calibrated via the standard sample and the three-coordinate measuring method, this method has higher measuring accuracy (2) The system provided herein has high measuring efficiency and high degree of automation. The cooperative motion of the 6-DOF robot and the single-axis table is capable of locating the relative spatial position between the optical scanner and the turbine guide vane can be adjusted accurately and rapidly. The automatic control unit can realize the coordinated work of the 6-DOF robot, the single-axis table and the optical scanner, so as to automatically scan the turbine guide vane. After the scanning, the data processing module automatically processes the point cloud data, calculates the exhaust area of the turbine guide vane and outputs the measurement report, significantly improving the measuring efficiency. In addition, the 6-DOF robot further improves the convenience, flexibility and operation efficiency of teaching.

(3) The system provided herein is more flexible and adaptable. Compared with the contact measurement method, this method is based on the optical non-contact measurement method, and is especially suitable for measuring the three-dimensional coordinates of the contour of the inner cavity with complex curved surfaces, such as the throats of the guide vane.

Figure 1:
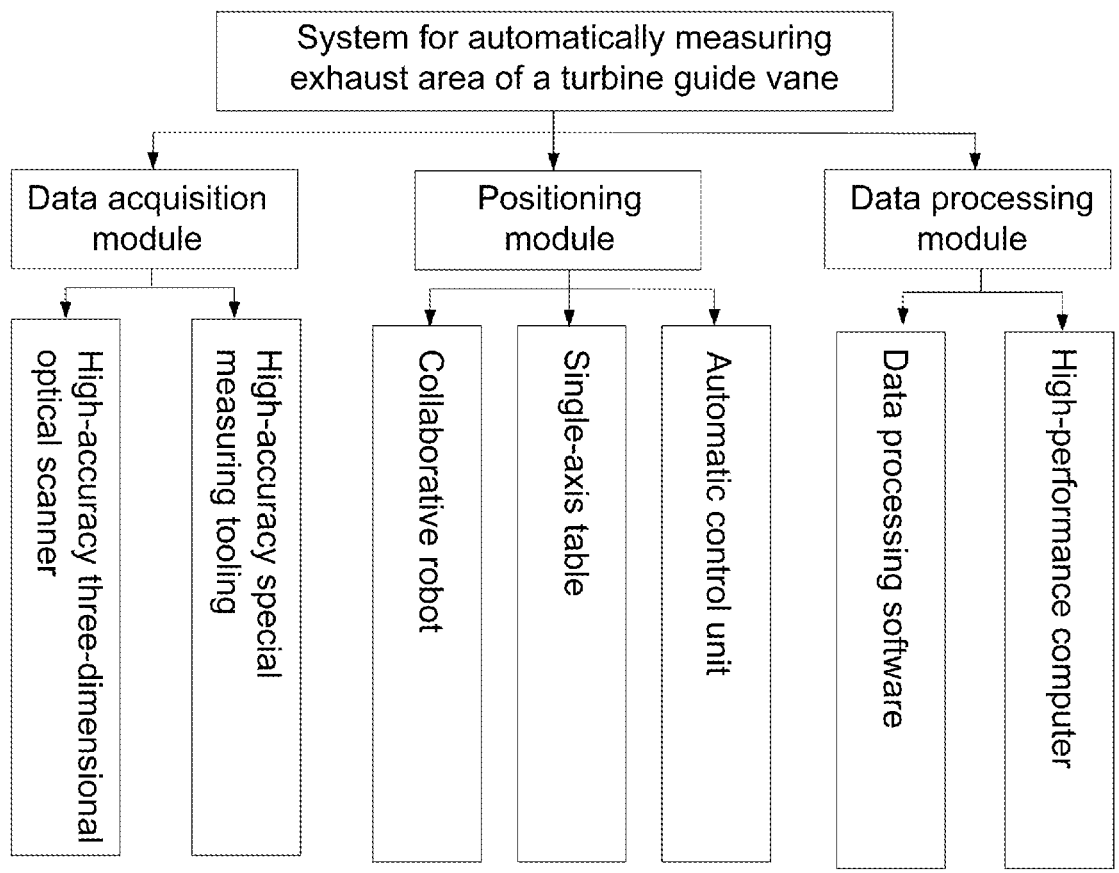
FIG. 1 is a system block diagram of a system for automatically measuring an exhaust area of a turbine guide vane according to an embodiment of this disclosure.

In the drawings, 1, automatic control unit; 2, electrical control cabinet; 3, 6-DOF robot; 4, optical scanner; 5, turbine guide vane; 6, positioning tooling; 7, single-axis table; 8, data processing module; 9, housing; and 10, protective fence.

DETAILED DESCRIPTION OF EMBODIMENTS

This application will be described in detail below with reference to the accompanying drawings and embodiments.

Embodiment 1

Based on the principle of non-contact optical measurement, this embodiment provides a system for automatically measuring an exhaust area of a turbine guide vane using a non-contact optical measurement, so as to measure the exhaust area of the turbine guide vane effectively and accurately.

Referring to an embodiment shown in FIG. 1, the system for automatically measuring the exhaust area of the turbine guide vane includes a data acquisition module, a positioning module, and a data processing module 8.

The data acquisition module includes an optical scanner 4 and a positioning tooling 6, and the data acquisition module is configured to measure a three-dimensional point cloud coordinate of a contour of each of a plurality of throats of the turbine guide vane 5 to obtain high-precision and high-density point cloud data. The optical scanner 4 is a high-precision optical scanner.

The positioning module includes a collaborative robot, a single-axis table 7 and an automatic control unit 1, and positioning module is configured to automatically and freely adjust a relative spatial position between the optical scanner 4 and the turbine guide vane 5, and assist the data acquisition module to realize a high-efficiency and high-precision automatic measurement. The collaborative robot is a six-degree-of-freedom (6-DOF) robot 3.

The data processing module 8 is configured to process three-dimensional point cloud data of the contour of each of the plurality of throats of the turbine guide vane 5, calculate exhaust areas and output a measurement report. The processing of three-dimensional point cloud data the contour of each of the plurality of throats is to fit the contour of each of the of throats through reconstructing a high-accuracy three-dimensional point cloud of each of the plurality of throats of the turbine guide vane 5 according to the three-dimensional point cloud coordinate of each of the plurality of throats obtained by the data acquisition module. The calculation of the exhaust area is to calculate an exhaust area of each of the plurality of throats and a total exhaust area of the turbine guide vane 5.

Figure 2:
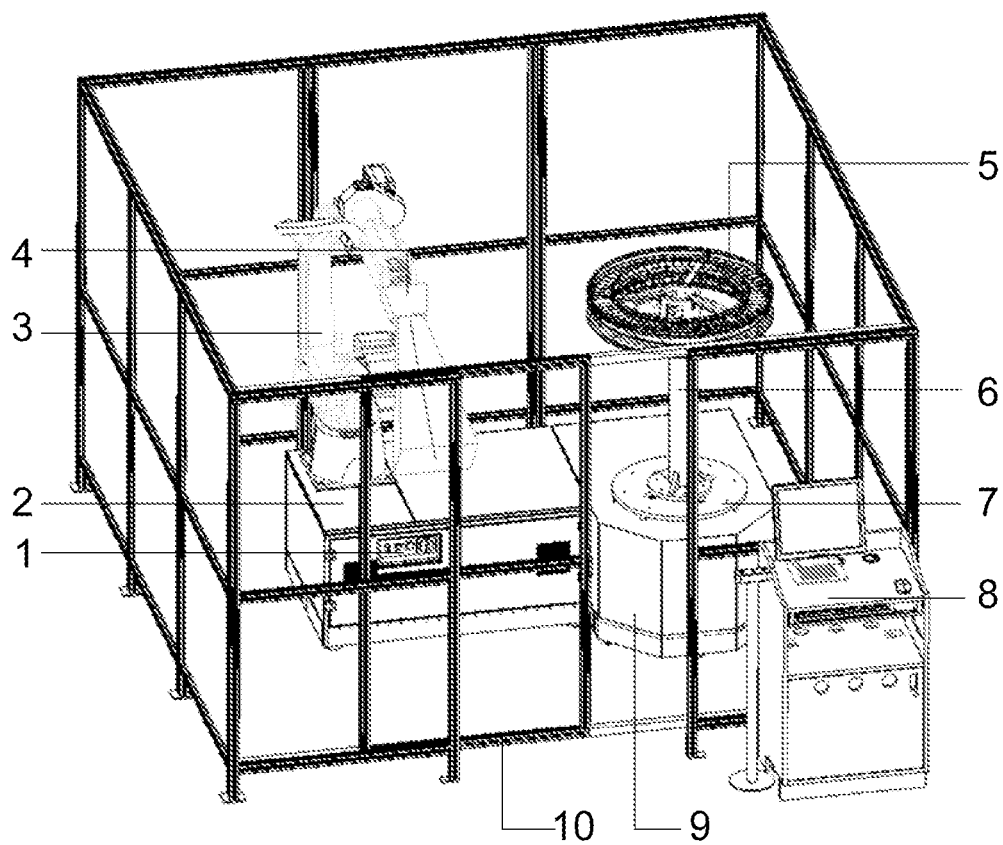
FIG. 2 is a schematic structural diagram of the system for automatically measuring the exhaust area of the turbine guide vane according to an embodiment of this disclosure.

Referring to an embodiment shown in FIG. 2, the system provided herein is integrally arranged inside a protective fence 10, except for the data processing module 8. The automatic control unit 1 includes an automatic control hardware and an automatic control software. The automatic control hardware is arranged in the electrical control cabinet 2. The automatic control hardware is designed to be miniaturized and integrated. The automatic control hardware integrates a controller of the 6-DOF robot 3, a controller of the optical scanner 4, a controller of the single-axis table, a cable and an electronic component. The controller of the 6-DOF robot 3 is electrically connected to the 6-DOF robot 3; the controller of the optical scanner 4 is electrically connected to the optical scanner 4; and the controller of the single-axis table is electrically connected to the single-axis table. The automatic control software is installed on a high-performance computer. The high-performance computer is electrically connected to the automatic control hardware. The automatic control software is configured to control the automatic control hardware, so as to control a cooperative motion of the 6-DOF robot 3, the optical scanner 4 and the single-axis table 7. A time-sequence response mechanism of the automatic control unit 1 allows the 6-DOF robot 3, the optical scanner 4 and the single-axis table 7 to work together effectively and accurately, so as to realize a high-efficiency and high-precision automatic measurement.

An upper surface of the electrical control cabinet 2 is provided with a robot mounting base. The 6-DOF robot 3 is mounted on the robot mounting base though a mounting surface. The 6-DOF robot 3 is provided with six joints. Each joint of the six joints is provided with a motor and a speed reducer. A flange of a sixth shaft at an end of the 6-DOF robot 3 is connected to a flange of the optical scanner 4. Each joint of the six joints of the 6-DOF robot 3 is configured to be driven to move, so as to adjust a spatial posture of the optical scanner 4 freely. A relative spatial position between the optical scanner 4 and the turbine guide vane 5 is adjusted through a cooperative motion between the six joints of the 6-DOF robot 3 rather than by hand, and therefore the locating operation is accurate and efficient.

The 6-DOF robot 3 is the collaborative robot having an automatic operation mode and a collaborative operation mode. Under the automatic operation mode, an automatic communication module (that is, an automatic communication module between controllers) between the 6-DOF robot 3 and the optical scanner 4 allows the 6-DOF robot 3 and the optical scanner 4 to work together (that is, after the optical scanner 4 completes a circumferential traversal scanning on the turbine guide vane 5 at a current position, the 6-DOF robot 3 is indicated to adjust a position of the optical scanner 4), such that the optical scanner 4 automatically completes the traversal scanning on the turbine guide vane 5 according to a preset automatic scanning program. Teaching of an automatic scanning path can be realized through dragging the 6-DOF robot 3 by an operator, which is simple and efficient. Under the collaborative operation mode, the optical scanner is positioned though dragging the 6-DOF robot 3 by the operator. A wireless Bluetooth remote is operated to control the optical scanner 4 to scan, so as to complete the traversal scanning on the turbine guide vane 5 via a human-machine collaboration.

The advantages of adopting the 6-DOF robot 3 are as follows. (1) The 6-DOF robot 3 is extremely safe. Under the automatic operation mode, if the 6-DOF robot 3 touches a person or a person touches the 6-DOF robot 3, the 6-DOF robot 3 will automatically stop, so as to avoid hurt people. Under the collaborative operation mode, the 6-DOF robot 3 can work with people without the protective fence 10. (2) The 6-DOF robot 3 has various working modes. The 6-DOF robot 3 can not only run automatically, but also can coordinate with the operator to move in real time and be positioned under the control of the operator. (3) The 6-DOF robot 3 has high teaching efficiency. The scanning path teaching can be realized by dragging the robot, which is convenient, flexible and efficient.

The optical scanner 4 includes a structured light projecting unit and an optical camera group. The point cloud data of the three-dimensional contour of the throat of the turbine guide vane 5 is obtained according to change information of a structured light projected on a surface of the turbine guide vane 5. The optical scanner 4 may be a three-dimensional linear structured light scanner, a fringe projection scanner or a spot projection scanner. The optical scanner has high accuracy, and can accurately measure the point cloud coordinate. Moreover, the non-contact optical measurement is more adaptable and flexible for measuring a special-shaped throat of the turbine guide vane. In this embodiment, the optical scanner 4 is provided with a high-resolution projector and two high-resolution cameras. The high-resolution projector is arranged between the two high-resolution cameras. In addition, a distance-measuring module (such as an infrared positioning sensor) is provided on the optical scanner, and is configured to measure a distance between the optical scanner 4 and the turbine guide vane 5, so as to ensure that the optical scanner 4 is at the optimal measurement distance.

The single-axis table 7 is arranged inside a housing 9. The single-axis table 7 includes a motor, a bearing, a main shaft, a code disc, a base and a table. A side surface of the housing 9 is connected to a side surface of the electrical control cabinet 2, and both of the side surface of the housing 9 and the side surface of the electrical control cabinet 2 are provided with a matching hole to allow the cable to pass through. Both the housing 9 and the electrical control cabinet 2 are in contact with the ground through a leveling foot. A main shaft of the single-axis is arranged along a vertical direction and is capable of rotating around an axis of the main shaft under the driving of the motor. The angular rotation of the single-axis table 7 is accurate, and an error of angular positioning is not greater than ±2". In addition, the single-axis table 7 has a bearing capacity of no less than 80 Kg, such that the single-axis table 7 can be equipped with various types of turbine guides and corresponding positioning tooling. Moreover, after being positioned, the single-axis table 7 is able to be stable fast.

In order to improve the integration degree of the automatic control unit 1 and the reliability of the system, the main shaft of the single-axis table 7 is configured as an external shaft of the 6-DOF robot 3, that is, the controller of the single-axis table 7 is integrated into the controller of the 6-DOF robot 3, and the controller of the 6-DOF robot 3 is configured to control the 6-DOF robot 3 and the single-axis table 7.

An upper surface of the table of the single-axis table 7 is connected to the positioning tooling 6, and an upper end of the positioning tooling 6 is fixedly connected to the turbine guide vane 5. The motor of the single-axis table 7 is configured to drive the main shaft to rotate. The positioning tooling 6 is configured to drive the turbine guide vane 5 to rotate to allow the turbine guide vane 5 to rotate at any angle.

The 6-DOF robot 3 is used in conjunction with the single-axis table 7 without requiring a manual adjustment of the posture of the optical scanner 4, reducing the number of pose adjustments of the optical scanner 4 during the scanning process, so as to improve the measuring efficiency. The single-axis table 7 is equipped with the turbine guide vane 5, so as to allow the turbine guide vane 5 to rotate at any angle. The single-axis table 7 is in linkage with the 6-DOF robot 3, which can not only effectively expand the action scope of the 6-DOF robot 3, but also improve the efficiency of scanning and measurement.

The turbine guide vane 5 is of a rotational symmetrical structure. Therefore, the turbine guide vane 5 is configured to be driven by the single-axis table 7 to rotate at any angle with the position of the optical scanner 4 unchanged, so as to rapidly and accurately scan and measure any position along a circumferential direction of the turbine guide vane 5 at a height corresponding to a lens of the optical scanner 4.

The positioning tooling 6 is made of carbon fiber, and has sufficient strength and stiffness and an extremely low thermal expansion coefficient. The positioning tooling 6 is configured for locating and clamping the turbine guide vane 5 and arranging a plurality of marking points spaced apart on the positioning tooling 6. When the optical scanner 4 scans the turbine guide vane 5, the marking points are recognized by the optical scanner 4, so as to facilitate accurately splicing multiple local point cloud data of the turbine guide vane 5 at different measuring angles and different measuring positions in subsequent processing.

The data processing module 8 includes a data processing software and a high-performance computer. The data processing software is installed on the high-performance computer. The high-performance computer is electrically connected to the optical scanner 4. The scanning data (point cloud data of the three-dimensional contour of each of the plurality of the throats of the turbine guide vane 5) obtained by the optical scanner 4 is transmitted to a memory of the high-performance computer, and processed by the data processing software, such that the exhaust area of each of the plurality of throats and the total exhaust area of the turbine guide vane are calculated and a measurement report is output.

In this embodiment, the system provided herein includes a plurality of coordinate systems, which includes a coordinate system of a scanning head, a coordinate system of a robot and a coordinate system of a table. The coordinate system of the robot includes a world coordinate system of the robot and a tool coordinate system of the robot, and the tool coordinate system of the robot is the coordinate system of the scanning head. In order to facilitate the data processing of the data processing module 8, a spatial position relationship between the plurality of coordinate systems is precisely calibrated based on the world coordinate system of the robot, so as to obtain a relative position relationship between the coordinate system of the scanning head, the coordinate system of the table and the world coordinate system of the robot, so as to unify the plurality of coordinate systems.

The working principle of the system provided herein is as follows.

The 6-DOF robot 3 is equipped with the optical scanner 4. By controlling the movement of the 6-DOF robot 3, the relative spatial position between the optical scanner 4 and the turbine guide vane 5 can be quickly and accurately positioned. The optical scanner 4 is configured to project structured light on the surface of the turbine guide vane 5. Changed structured light is modulated by the surface to be measured, and point cloud data of the local three-dimensional contour the throat of the turbine guide vane 5 is obtained after resolving the changed structured light.

The single-axis table 7 is equipped with the turbine guide vane 5, so that the turbine guide vane 5 can be rotated at any angle, such that the optical scanner 4 is capable of scanning and measuring different parts of turbine guide vane 5.

The data processing module 8 is configured to splice the multiple point cloud data of the local three-dimensional contour at different angles and different positions of the throat of the turbine guide vane 5 according to a calibration of the plurality of coordinate systems and the marking points of the positioning tooling 6 to obtain point cloud data of the three-dimensional contour of each of the plurality of throats of the turbine guide vane 5. The data processing module 8 is configured to process the point cloud data of the turbine guide vane 5, calculate the exhaust area of each of the plurality of throats and the total exhaust area of the turbine guide vane and output the measurement report using the data processing software of the prior art.

Embodiment 2

A method for automatically measuring an exhaust area of a turbine guide using the system mentioned above is provided, and the method is performed as follows.

(S1) The turbine guide vane 5 is connected to the positioning tooling 6, and then turbine guide vane 5 is fixed to the positioning tooling 6 to prepare for an automatic measurement.

(S2) The automatic control unit is started through a host computer. The automatic control unit 1 controls the 6-DOF robot 3, the optical scanner 4 and the single-axis table 7 to work collaboratively according to a preset time sequence, so as to achieve the automatic measurement. Particularly, the automatic control unit 1 controls the 6-DOF robot 3 to move to adjust a relative spatial position between the optical scanner 4 and the turbine guide vane 5 fast and accurately. The automatic control unit 1 controls the single-axis table to rotate according to a preset frequency. The single-axis table feeds a signal back to the automatic control unit 1 every time the single-axis table rotates by a preset angle. The automatic control unit controls the optical scanner 4 to perform a local scanning on the turbine guide vane 5 at the current position according to the signal to obtain local three-dimensional point cloud data of a contour of each of the plurality of throats.

(S3) The single-axis table feeds back a signal to the automatic control unit 1 after rotating one cycle at the preset frequency. The automatic control unit 1 controls the optical scanner and the single-axis table to stop. The automatic control unit controls the 6-DOF robot to move, so as to move the optical scanner 4 to a next preset position. The optical scanner and the single-axis table are restarted to perform the circumferential traversal scanning at the next preset position;

(S4) Step (S3) is repeated until the optical scanner 4 completes the traversal scanning on all preset positions, so as to complete an automatic scanning of the turbine guide vane 5 to obtain a series of point cloud data of the local three-dimensional contour of the plurality of throats of the turbine guide vane 5. Scanning data is sent to the data processing module 8 in real time.

(S5) After the scanning, the data processing module 8 automatically processes the point cloud data of the turbine guide vane 5, calculates an exhaust area of each of the plurality of throats and a total exhaust area of the turbine guide vane and output a measurement report, such that the automatic measurement is finished.

This application has been described in detail above with reference to the specific embodiments. Obviously, various modifications or improvements can be made by those skilled in the art based on this application. Thus, any modifications or improvement without departing from the spirit of the application should still fall within the scope of the present application defined by the appended claims.

What is claimed is:

1. A system for automatically measuring an exhaust area of a turbine guide vane, comprising:
    a data acquisition module;
    a positioning module; and
    a data processing module;
    wherein the data acquisition module is configured to measure a three-dimensional point cloud coordinate of a contour of each of a plurality of throats of the turbine guide vane using a non-contact measurement;
    the positioning module is configured to automatically adjust a relative spatial position between the data acquisition module and the turbine guide vane, so as to allow the data acquisition module to perform a traversal scanning on the turbine guide; and
    the data processing module is configured to fit a three-dimensional contour of each of the plurality of throats according to the three-dimensional point cloud coordinate measured by the data acquisition module, so as to calculate an exhaust area of each of the plurality of throats and the exhaust area of the turbine guide vane;
    wherein the positioning module comprises a six-degree-of-freedom (6-DOF) robot, an automatic control unit, and a single-axis table;
    the single-axis table is configured to feed a first signal back to the automatic control unit every time the single-axis table rotates by a preset angle; and
    the automatic control unit is configured to control the data acquisition module and the single-axis table to stop when the single-axis table feeds back a second signal to the automatic control unit after rotating one cycle at a preset frequency and control the 6-DOF robot to move.

2. The system of claim 1, wherein the data acquisition module comprises an optical scanner and a positioning tooling;
    the optical scanner is connected to the positioning module, and the optical scanner is configured to be driven by the positioning module to move, so as to adjust a relative spatial position between the optical scanner and the turbine guide vane; and
    the positioning tooling is configured to locate and clamp the turbine guide vane; and at least three marking points are arranged spaced apart on the positioning tooling along a circumferential direction of the positioning tooling, wherein the at least three marking points are configured to be recognized by the optical scanner.

3. The system of claim 2, wherein a distance-measuring module is arranged on the optical scanner, and is configured to measure a distance between a lens of the optical scanner and the turbine guide vane, so as to keep the optical scanner at an optimum measurement distance from the turbine guide vane.

4. The system of claim 3, wherein the distance-measuring module is an infrared position sensor.

5. The system of claim 2, wherein
    the optical scanner is connected to an end of the 6-DOF robot, and is driven by the 6-DOF robot to move;
    the single-axis table is connected to the turbine guide vane via the positioning tooling, and is configured to drive the turbine guide vane to rotate; and
    the automatic control unit is configured to control the 6-DOF robot, the optical scanner and the single-axis table to move according to a preset program to allow the optical scanner to complete the traversal scanning on the turbine guide vane.

6. The system of claim 5, wherein the 6-DOF robot is a collaborative robot having an automatic operation mode and a collaborative operation mode.

7. The system of claim 2, wherein the positioning tooling is made of carbon fiber.

8. The system of claim 5, wherein a controller of the single-axis table is integrated into a controller of the 6-DOF robot, such that the 6-DOF robot and the single-axis table are controlled by the controller of the 6-DOF robot.

9. A method for automatically measuring an exhaust area of a turbine guide vane using a system, comprising:
    a data acquisition module;
    a positioning module; and
    a data processing module;
    wherein the data acquisition module is configured to measure a three-dimensional point cloud coordinate of a contour of each of a plurality of throats of the turbine guide vane using a non-contact measurement;
    the positioning module is configured to automatically adjust a relative spatial position between the data acquisition module and the turbine guide vane, so as to allow the data acquisition module to perform a traversal scanning on the turbine guide;
    the data processing module is configured to fit a three-dimensional contour of each of the plurality of throats according to the three-dimensional point cloud coordinate measured by the data acquisition module, so as to calculate an exhaust area of each of the plurality of throats and the exhaust area of the turbine guide vane;

wherein the positioning module comprises a six-degree-of-freedom (6-DOF) robot, an automatic control unit, and a single-axis table;

the single-axis table is configured to feed a first signal back to the automatic control unit every time the single-axis table rotates by a preset angle;

the automatic control unit is configured to control the data acquisition module and the single-axis table to stop when the single-axis table feeds back a second signal to the automatic control unit after rotating one cycle at a preset frequency and control the 6-DOF robot to move;

wherein the data acquisition module comprises an optical scanner and a positioning tooling; the optical scanner is connected to the positioning module, and the optical scanner is configured to be driven by the positioning module to move, so as to adjust a relative spatial position between the optical scanner and the turbine guide vane; and the positioning tooling is configured to locate and clamp the turbine guide vane; and at least three marking points are arranged spaced apart on the positioning tooling along a circumferential direction of the positioning tooling, wherein the at least three marking points are configured to be recognized by the optical scanner;

wherein the optical scanner is connected to an end of the 6-DOF robot, and is driven by the 6-DOF robot to move;

the single-axis table is connected to the turbine guide vane via the positioning tooling, and is configured to drive the turbine guide vane to rotate; and the automatic control unit is configured to control the 6-DOF robot, the optical scanner and the single-axis table to move according to a preset program to allow the optical scanner to complete the traversal scanning on the turbine guide vane;

the method comprising: (S1) connecting the turbine guide vane to the positioning tooling followed by fixing; (S2) starting, by a host computer, the automatic control unit; controlling, by the automatic control unit, the 6-DOF robot to move to adjust a relative spatial position between the optical scanner and the turbine guide vane; controlling, by the automatic control unit, the single-axis table to rotate according to a preset frequency; feeding, by the single-axis table, a signal back to the automatic control unit every time the single-axis table rotates by a preset angle; and controlling, by the automatic control unit, the optical scanner to perform a local scanning on the turbine guide vane at the current position according to the signal to obtain a local three-dimensional point cloud data of a contour of each of the plurality of throats; (S3) feeding back a signal, by the single-axis table, to the automatic control unit after rotating one cycle, and controlling, by the automatic control unit, the optical scanner and the single-axis table to stop; controlling, by the automatic control unit, the 6-DOF robot to move, so as to move the optical scanner to a next preset position; and restarting the optical scanner and the single-axis table to perform a circumferential traversal scanning at the next preset position; (S4) repeating step (S3) until the optical scanner completes the traversal scanning on all preset positions, so as to complete an automatic scanning of the turbine guide vane to obtain scanning data; and sending the scanning data to the data processing module in real time; and (S5) automatically performing, by the data processing module, fitting of a three-dimensional contour of each of the plurality of throats according to the scanning data, and calculating, by the data processing module, the exhaust area of each of the plurality of throats and the total exhaust area of the turbine guide vane.

* * * * *